US012060848B2

(12) United States Patent
Seo et al.

(10) Patent No.: US 12,060,848 B2
(45) **Date of Patent: *Aug. 13, 2024**

(54) MOTOR CONTROL DEVICE

(71) Applicant: DENSO CORPORATION, Kariya (JP)

(72) Inventors: Yuichi Seo, Kariya (JP); Yuuji Hidaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,241

(22) Filed: May 26, 2023

(65) Prior Publication Data

US 2024/0044301 A1 Feb. 8, 2024

(30) Foreign Application Priority Data

Aug. 3, 2022 (JP) ................................ 2022-123988

(51) Int. Cl.
*F02D 41/22* (2006.01)
*F02D 41/30* (2006.01)

(52) U.S. Cl.
CPC ....... *F02D 41/221* (2013.01); *F02D 41/3082* (2013.01); *F02D 2200/0606* (2013.01); *F02D 2200/50* (2013.01)

(58) Field of Classification Search
CPC .... F02D 41/22; F02D 41/221; F02D 41/3082; F02D 2041/226; F02D 2200/0606; F02D 2200/50
See application file for complete search history.

(56) References Cited

U.S. PATENT DOCUMENTS 7,431,018 B2 * 10/2008 Tsujimoto .......... F02M 63/0225 123/446
2013/0340721 A1 * 12/2013 Suda .................... F02D 41/221 123/496

FOREIGN PATENT DOCUMENTS

JP 2021-019398 A 2/2021
JP 7010064 B2 * 1/2022 .......... H04L 9/0861

OTHER PUBLICATIONS

U.S. Appl. No. 18/324,247, filed May 26, 2023, Seo et al.
U.S. Appl. No. 18/324,222, filed May 26, 2023, Seo et al.

* cited by examiner

*Primary Examiner* — Grant Moubry
(74) *Attorney, Agent, or Firm* — Posz Law Group, PLC

(57) ABSTRACT

A motor control device includes: a rotation control determination unit configured to determine whether a motor rotation control to rotate the motor fails; a parameter calculation unit configured to calculate a control failure frequency parameter having a correlation with a frequency of failure in the motor rotation control based on a determination result by the rotation control determination unit; and an abnormality determination unit configured to determine whether an abnormality has occurred in the motor based on the control failure frequency parameter.

7 Claims, 6 Drawing Sheets

MOTOR CONTROL DEVICE

CROSS REFERENCE TO RELATED APPLICATION

This application is based on Japanese Patent Application No. 2022-123988 filed on Aug. 3, 2022, the disclosure of which is incorporated herein by reference.

TECHNICAL FIELD

The present disclosure relates to a motor control device that controls a motor.

BACKGROUND

A motor control device determines a sign of an abnormality by comparing a motor current value, a motor voltage value, a motor rotation speed, and the like with a predetermined determination threshold value when a motor is driven to function as a source for driving a fuel pump.

SUMMARY

According to an aspect of the present disclosure, a motor control device configured to control a motor includes a rotation control determination unit, a parameter calculation unit, and an abnormality determination unit.

The rotation control determination unit is configured to determine whether a motor rotation control to rotate the motor has failed. The parameter calculation unit is configured to calculate a control failure frequency parameter having a correlation with a frequency of failure in the motor rotation control based on a determination result by the rotation control determination unit.

The abnormality determination unit is configured to determine whether an abnormality has occurred in the motor based on the control failure frequency parameter.

DETAILED DESCRIPTION

Figure 1:
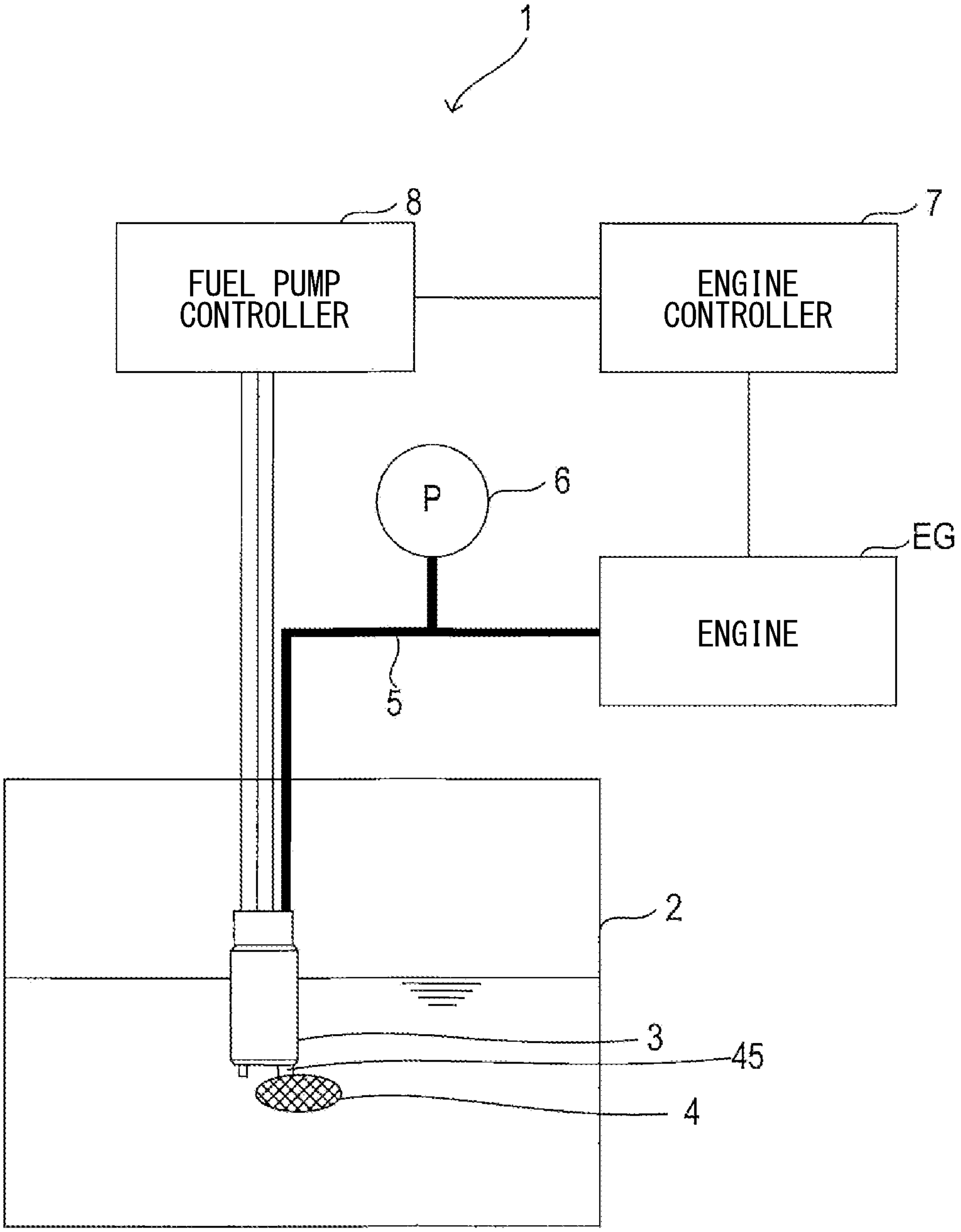
FIG. 1 is a block diagram illustrating a configuration of a fuel supply system.

A motor control device determines a sign of an abnormality by comparing a motor current value, a motor voltage value, a motor rotation speed, and the like with a predetermined determination threshold value when a motor is driven to function as a drive source of a fuel pump.

The torque applied to the motor of the fuel pump increases when the pressure of the fuel increases, when a foreign matter is caught in the impeller of the fuel pump, or when the impeller of the fuel pump deforms and interferes with the casing of the fuel pump.

As a result of detailed studies by the inventors, when the torque applied to the motor of the fuel pump increases, since it is difficult to specify the cause of the increase in the torque, the detection accuracy of the abnormality in the motor of the fuel pump is low.

The present disclosure provides a motor control device to improve the detection accuracy of the abnormality in the motor of the fuel pump.

According to one aspect of the present disclosure, a motor control device configured to control a motor includes: a rotation control determination unit; a parameter calculation unit; an abnormality determination unit; and a stop suppression unit.

The rotation control determination unit is configured to determine whether or not a motor rotation control for rotating the motor has failed. The parameter calculation unit is configured to calculate a control failure frequency parameter having a correlation with a frequency of failure in the motor rotation control based on a determination result by the rotation control determination unit.

The abnormality determination unit is configured to determine whether an abnormality has occurred in the motor based on the control failure frequency parameter.

The motor control device of the present disclosure configured as described above can determine an abnormality in which a foreign matter is caught in the impeller of the fuel pump or an abnormality in which the impeller of the fuel pump and the casing of the fuel pump interfere with each other when the frequency of failures in the motor rotation control increases. Therefore, the motor control device of the present disclosure can identify the cause of the abnormality in which the torque applied to the motor of the fuel pump increases when the abnormality occurs, and can improve the detection accuracy of the abnormality in the motor of the fuel pump.

According to another aspect of the present disclosure, a motor control device configured to control a motor includes a command-time motor starting unit and a command-time abnormality determination unit. The command-time motor starting unit is configured to, when receiving an abnormality confirmation command from an external device, execute a confirmation motor start for starting the motor under a confirmation starting condition set in advance so that starting of the motor is likely to fail.

The command-time abnormality determination unit is configured to determine whether or not an abnormality has occurred in the motor based on an execution result of the confirmation motor start by the command-time motor starting unit.

The motor control device of the present disclosure configured as described above can determine an abnormality in which a foreign matter is caught in the impeller of the fuel pump or an abnormality in which the impeller of the fuel pump and the casing of the fuel pump interfere with each other when the motor is started under the confirmation starting condition such that the start of the motor fails. Therefore, the motor control device of the present disclosure can identify the cause of the abnormality in which the torque applied to the motor of the fuel pump increases when the abnormality occurs, and can improve the detection accuracy of the abnormality in the motor of the fuel pump.

First Embodiment

Hereinafter, a first embodiment of the present disclosure will be described with reference to the drawings. The fuel supply system 1 of the present embodiment is mounted on a vehicle. As shown in FIG. 1, the fuel supply system 1 includes a fuel tank 2, a fuel pump 3, a suction filter 4, a fuel pipe 5, a pressure sensor 6, an engine controller 7, and a fuel pump controller 8.

The fuel tank 2 stores fuel to be supplied to the engine EG of the vehicle. The engine EG includes multiple injectors respectively corresponding to the multiple cylinders. The injectors inject fuel into the cylinders respectively.

The fuel pump 3 is installed inside the fuel tank 2 and pumps up the fuel stored in the fuel tank 2. The suction filter 4 is installed near the suction hole 45 of the fuel pump 3 in the fuel tank 2 and removes foreign matters from the fuel sucked by the fuel pump 3 by collecting foreign matters in the fuel.

The fuel pipe 5 supplies the fuel from the fuel pump 3 to the engine EG. The pressure sensor 6 detects the pressure of fuel flowing through the fuel pipe 5 and outputs a pressure detection signal indicating the detection result.

The engine controller 7 drives the injectors to control fuel injection to the engine EG. The engine controller 7 controls the fuel pump 3 via the fuel pump controller 8 so that the fuel pressure indicated by the pressure detection signal acquired from the pressure sensor 6 matches the target fuel pressure.

Figure 2:
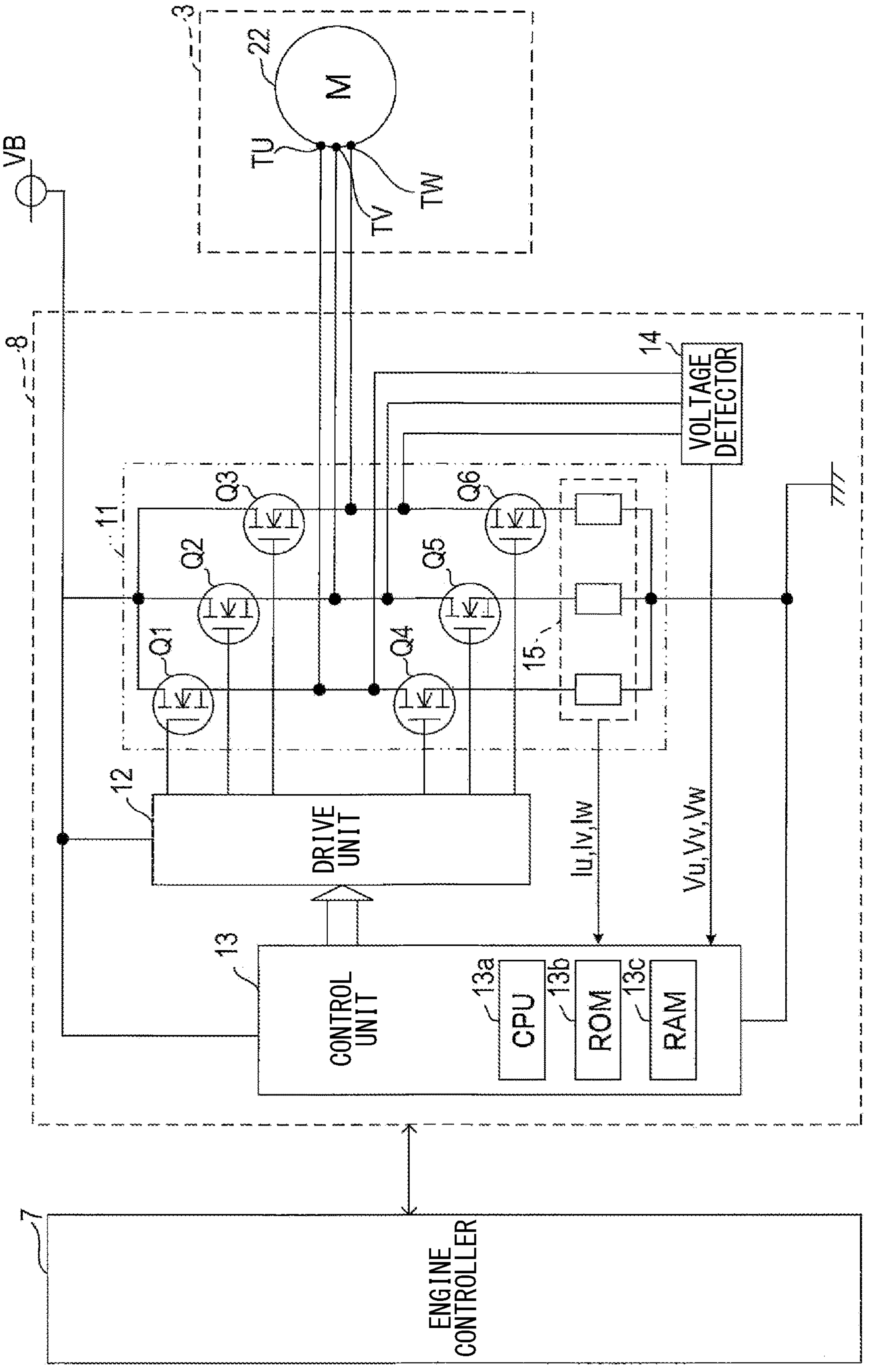
FIG. 2 is a block diagram illustrating a configuration of a fuel pump and a fuel pump controller.

The fuel pump controller 8 controls the fuel pump 3 based on a command from the engine controller 7. As shown in FIG. 2, the fuel pump 3 has a pump motor 22. In the present embodiment, the pump motor 22 is a three-phase brushless motor.

The fuel pump controller 8 includes an inverter circuit 11, a drive unit 12 and a control unit 13. The inverter circuit 11 receives power supply from a battery (not shown) and applies a battery voltage VB between the terminals TU, TV, TW of the pump motor 22 (between U-phase and V-phase, between V-phase and W-phase, and between W-phase and U-phase) to energize the stator coil so as to rotate the pump motor 22.

The U-phase, V-phase and W-phase stator coils of the pump motor 22 are connected in a Y-connection. The inverter circuit 11 is connected to the three terminals TU, TV, TW opposite to the Y-connection. The inverter circuit 11 includes a three-phase full-bridge circuit having six switching elements Q1, Q2, Q3, Q4, Q5, and Q6.

The switching elements Q1, Q2, and Q3 are disposed as so-called high-side switches between the positive electrode side of the battery and the terminals TU, TV, and TW of the pump motor 22. The switching elements Q4, Q5, and Q6 are disposed as so-called low-side switches between the negative electrode side of the battery and the terminals TU, TV, and TW of the pump motor 22.

Therefore, in the inverter circuit 11, the battery voltage VB is applied between any of the terminals TU, TV, and TW of the pump motor 22 by turning on one high-side switch and one low-side switch having different phases.

The terminal to which the battery voltage VB is applied and the application direction of the battery voltage VB can be switched by switching the switching element to be turned on. The current flowing through the pump motor 22 can be controlled by controlling the ON time of the switching element.

The drive unit 12 turns on or off the switching elements Q1 to Q6 in the inverter circuit 11 in accordance with the control signal output from the control unit 13. Thus, current flows through the U, V, W phase stator coil of the pump motor 22, thereby rotating the pump motor 22.

The control unit 13 is an electronic control unit including as a main component a microcontroller having a CPU 13*a*, a ROM 13*b*, a RAM 13*c*, and the like. Various functions of the microcontroller are realized by causing the CPU 13*a* to execute programs stored in a non-transitory tangible storage medium. The ROM 13*b* corresponds to a non-transitory tangible storage medium in which the programs are stored. A method corresponding to the program is executed by executing the program. Note that a part or all of the functions to be executed by the CPU 13*a* may be configured as hardware by one or multiple ICs or the like. The number of microcontrollers configuring the control unit 13 may be one or multiple.

The control unit 13 controls the current flowing through the U, V, W phase stator coil so that the target rotation speed instructed by the engine controller 7 matches the rotation speed of the pump motor 22 (the motor rotation speed). The target rotation speed is set so that the pressure of the fuel flowing in the fuel pipe 5 becomes a predetermined pressure.

The fuel pump controller 8 further includes a voltage detector 14 and a current detection unit 15. The voltage detector 14 detects the voltage Vu, Vv, Vw of the terminal TU, TV, TW of the pump motor 22. The current detection unit 15 detects the current Iu, Iv, Iw flowing through the U, V, W phase stator coil.

The detection signal of the voltage detector 14 and the detection signal of the current detection unit 15 are input to the control unit 13 and used for controlling the pump motor 22 and detecting abnormality. The control unit 13 turns on one high-side switch and one low-side switch having different phases in order to rotate the pump motor 22. In the present embodiment, the control unit 13 rotates the pump motor 22 by performing pulse width modulation control (hereinafter, PWM control). Specifically, for example, the control unit 13 maintains one of the two switching elements to be turned on in the on state, and periodically switches the other switching element between the on state and the off state in accordance with the duty.

In order to rotate the pump motor 22, the control unit 13 switches the switching element to be turned on in synchronization with the rotational position of the pump motor 22. In order to control the drive unit 12 in synchronization with the rotational position of the pump motor 22, the control unit 13 detects the rotational position of the pump motor 22. Specifically, the control unit 13 detects the rotational position of the pump motor 22 based on the voltage Vu, Vv, Vw acquired from the voltage detector 14. The control unit 13 generates a drive command based on the detected rotational position and outputs the drive command to the drive unit 12. Thus, the control unit 13 can control the pump motor 22 in synchronization with the rotational position of the pump motor 22.

Figure 3:
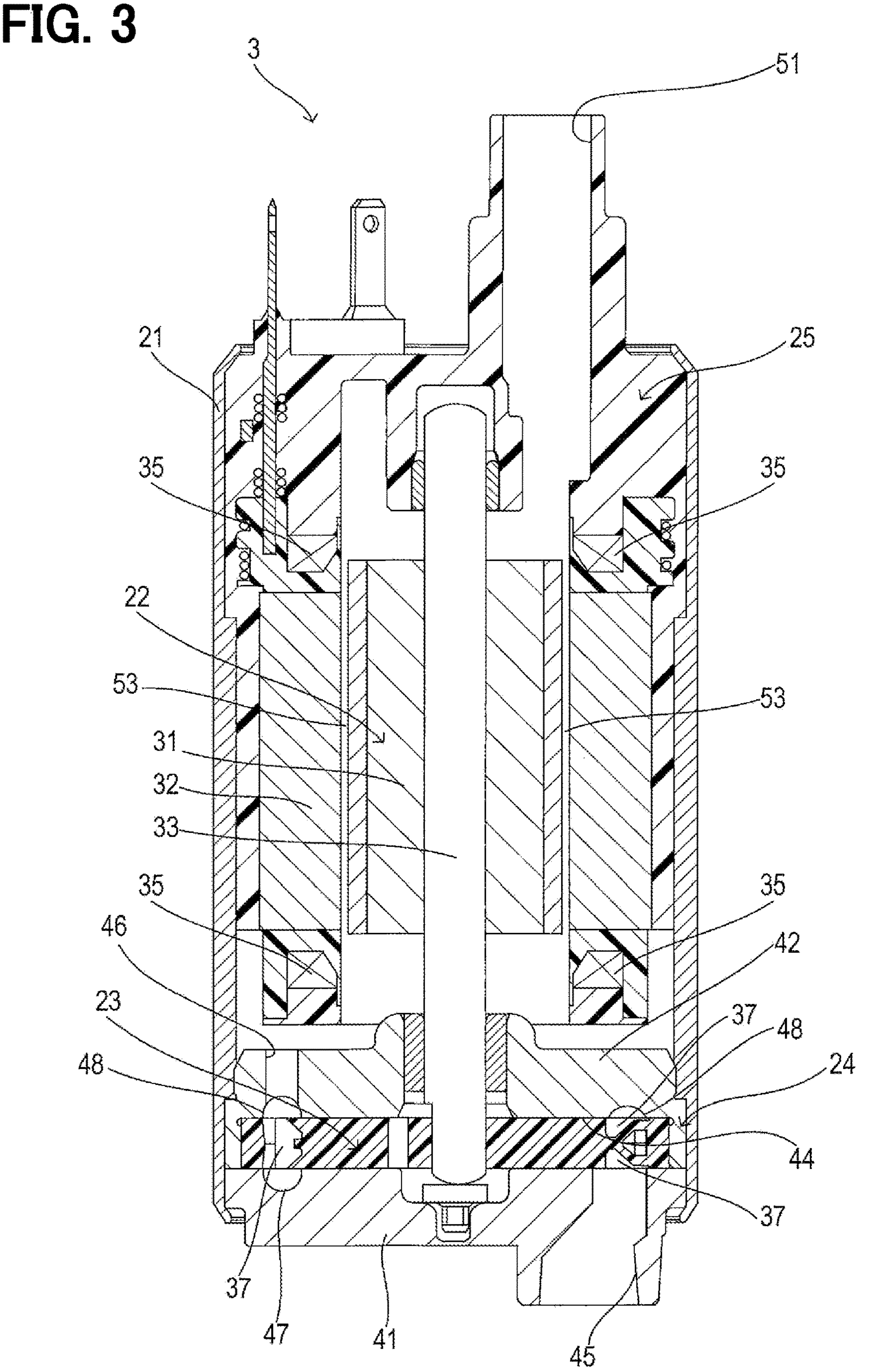
FIG. 3 is a sectional view illustrating the fuel pump.

As shown in FIG. 3, the fuel pump 3 includes a pump housing 21, a pump motor 22, an impeller 23, a pump case 24, and a motor cover 25. The pump housing 21 is a metal member formed in a cylindrical shape.

The pump motor 22 includes a rotor 31, a stator 32, and a shaft 33. The rotor 31 includes a cylindrical iron core and plural pairs of magnetic poles. A permanent magnet is used for the pair of magnetic poles. The pair of magnetic poles are arranged so that the N poles and the S poles are alternately and uniformly arranged on the outer periphery of the iron core.

The stator 32 is disposed at equal angular intervals around the rotor 31, and the winding 35 is wound around the stator 32. A U-phase, V-phase, or W-phase winding 35 is wound around the stator 32. The shaft 33 is a metal member formed in an elongated cylindrical shape. The shaft 33 is fixed to the rotor 31 such that its axis coincides with the axis of the rotor 31.

The pump motor 22 is installed in the pump housing 21 such that the axis of the shaft 33 coincides with the cylindrical axis of the pump housing 21. The impeller 23 is a resin member formed in a disk shape. Blade grooves 37 are arranged on the outer periphery of the impeller 23 in the circumferential direction. The impeller 23 is fixed to the shaft 33 such that the axis thereof and the axis of the shaft 33 coincide with each other, and is disposed inside the pump housing 21 at a first end of the pump housing 21 formed in a cylindrical shape along the axial direction.

The pump case 24 includes a first casing 41 and a second casing 42. The first casing 41 is installed to close the opening of the pump housing 21 at the first end of the pump housing 21.

The second casing 42 is installed inside the pump housing 21 so as to be in contact with the first casing 41 on the internal side. A recess 44 is formed in the second casing 42 on a side facing the first casing 41. The impeller 23 is rotatably housed in the recess 44.

The first casing 41 has a suction hole 45 passing through the first casing 41 along the axial direction of the pump housing 21. The opening of the suction hole 45 facing the second casing 42 is formed so as to face a part of the blade grooves 37 of the impeller 23.

The second casing 42 includes a discharge hole 46 passing through the second casing 42 along the axial direction of the pump housing 21. The opening of the discharge hole 46 facing the first casing 41 is formed so as to face a part of the blade grooves 37 of the impeller 23. The discharge hole 46 is disposed so as not to face the suction hole 45 along the axial direction of the pump housing 21.

The first casing 41 has a first flow groove 47 for allowing fuel to flow on a surface thereof facing the second casing 42. The first flow groove 47 is formed in an annular shape so as to face a part of the blade grooves 37 of the impeller 23. The first end of the annular first flow groove 47 faces the suction hole 45, and the second end of the first flow groove 47 faces the discharge hole 46.

In the recess 44 of the second casing 42, a second flow groove 48 for allowing fuel to flow is formed on the surface facing the first casing 41. The second flow groove 48 is formed in an annular shape so as to face a part of the blade grooves 37 of the impeller 23. The first end of the annular second flow groove 48 faces the suction hole 45, and the second end of the second flow groove 48 faces the discharge hole 46.

When the impeller 23 rotates and the fuel is pumped up from the suction hole 45, the fuel flows through a fuel flow path formed by the first flow groove 47, the second flow groove 48 and the blade groove 37. When the fuel reaches the second ends of the first flow groove 47 and the second flow groove 48, the fuel is discharged from the discharge hole 46.

The motor cover 25 fixes the pump motor 22 in the pump housing 21. The motor cover 25 is installed so as to close the opening of the pump housing 21 at the second end of the pump housing 21 formed in a cylindrical shape along the cylindrical axial direction.

The motor cover 25 includes a discharge hole 51 passing through the motor cover 25 along the axial direction of the pump housing 21. The fuel discharged from the discharge hole 46 of the pump case 24 is guided to the discharge hole 51 of the motor cover 25 through a fuel passage 53 formed between the rotor 31 of the pump motor 22 and the stator 32. Then, the fuel guided to the discharge hole 51 is discharged from the discharge hole 51 to the outside of the fuel pump 3.

Next, a procedure of a motor control process executed by the CPU 13*a* of the control unit 13 will be described. The motor control process is repeatedly executed during the operation of the control unit 13. The motor control process is terminated when a command to stop driving the pump motor 22 is received from the engine controller 7.

Figure 4:
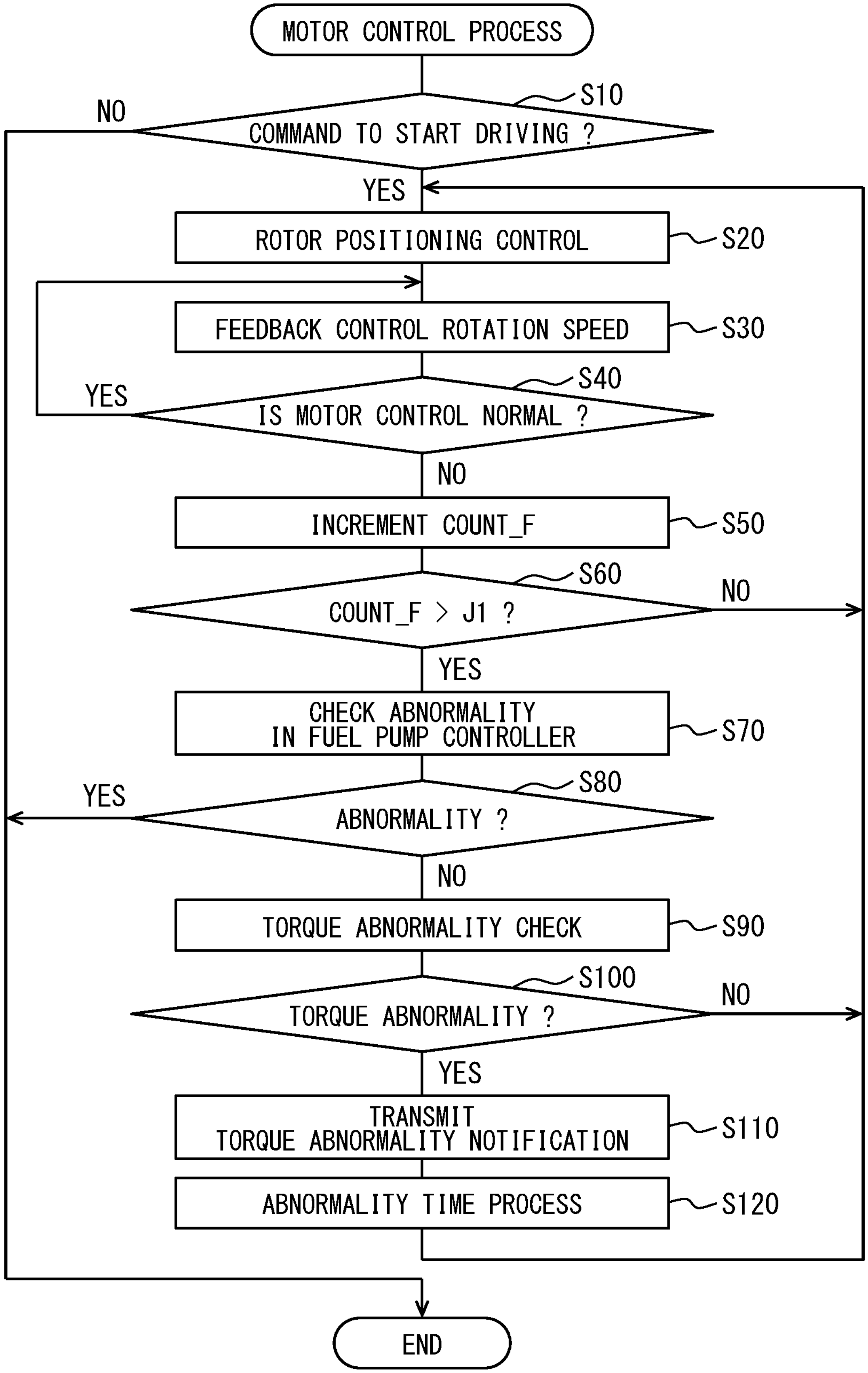
FIG. 4 is a flowchart illustrating a motor control process according to a first embodiment.

When the motor control process is executed, as shown in FIG. 4, the CPU 13*a* determines in S10 whether a command to start driving the pump motor 22 has been received from the engine controller 7. When the command for instructing the start of driving is not received, the CPU 13*a* ends the motor control process.

When the command instructing the start of driving is received, the CPU 13*a* executes a rotor positioning control in S20. Specifically, the CPU 13*a* sets the rotational position of the rotor 31 at a predetermined reference angle by energizing a stator coil of a specific phase (for example, between U and V) preset for initial driving of the pump motor 22 via the inverter circuit 11.

Next, in S30, the CPU 13*a* performs a feedback control so that the motor rotation speed and the target rotation speed coincide with each other. In the present embodiment, the CPU 13*a* executes PI control as the feedback control. Specifically, the CPU 13*a* calculates the duty of the PWM control based on a feedback control amount obtained by adding a value obtained by multiplying a deviation between the motor rotation speed and the target rotation speed by a proportional gain and a value obtained by multiplying an integral value of the deviation by an integral gain. Then, the CPU 13*a* selects two switching elements to be turned on in synchronization with the rotational position of the pump motor 22. Further the CPU 13*a* maintains one of the selected two switching elements in the ON state, and periodically switches the other switching element between the ON state and the OFF state in accordance with the duty.

In S40, the CPU 13*a* determines whether the motor control is normal. Specifically, the CPU 13*a* determines that the motor control is normal when the rotational position of the pump motor 22 corresponds to the current energization pattern. When the rotational position of the pump motor 22 does not correspond to the current energization pattern, the CPU 13*a* determines that the motor control is not normal.

The control unit 13 controls the pump motor 22 by sequentially switching the first energization pattern, the second energization pattern, the third energization pattern, the fourth energization pattern, the fifth energization pattern, and the sixth energization pattern in order starting with the earliest.

For example, the first energization pattern turns on the U-phase high-side switch and the V-phase low-side switch. The second energization pattern turns on the V-phase high-side switch and the W-phase low-side switch. The third energization pattern turns on the V-phase high-side switch and the U-phase low-side switch. The fourth energization pattern turns on the U-phase high-side switch and the W-phase low-side switch. The fifth energization pattern turns on the W-phase high-side switch and the U-phase low-side switch. The sixth energization pattern turns on the W-phase high side switch and the V phase low side switch.

When it is determined in S40 that the motor control is normal, the CPU 13*a* proceeds to S30. When it is determined in S40 that the motor control is not normal, the CPU 13*a* increments the number of control failures COUNT_F in S50.

In S60, the CPU 13*a* determines whether the number of control failures COUNT_F is larger than a preset abnormality determination value J1 (for example, 10 times). When the number of control failures COUNT_F is equal to or smaller than the abnormality determination value J1, the CPU 13*a* proceeds to S20. When the number of control failures COUNT_F is larger than the abnormality determination value J1, the CPU 13*a* executes an abnormality check of the fuel pump controller 8 in S70. For example, the CPU 13*a* checks whether a short circuit or disconnection has occurred in the wiring between the fuel pump controller 8 and the pump motor 22, or whether a short circuit or disconnection has occurred in the wiring inside the fuel pump controller 8.

In S80, the CPU 13*a* determines whether an abnormality has occurred in the fuel pump controller 8 based on the check result in S70. When an abnormality has occurred in the fuel pump controller 8, the CPU 13*a* ends the motor control process.

When an abnormality has not occurred in the fuel pump controller 8, the CPU 13*a* executes a torque abnormality check in S90. Specifically, the CPU 13*a* first sets the target rotation speed to the first check target rotation speed set in advance for the torque abnormality check, sets the start duty to the first check start duty set in advance for the torque abnormality check, and starts the pump motor 22. The first check target rotation speed is set to be higher than the target rotation speed when the pump motor 22 is started in a normal state. The first check start duty is set to be smaller than the start duty when the pump motor 22 is started in a normal state.

The first check target rotation speed and the first check start duty are conditions for making the start of the pump motor 22 likely to fail. If the torque is large when the impeller 23 is stationary, it is necessary to increase the force for operating the impeller 23. However, when the force for operating the impeller 23 is increased, the acceleration at the time when the impeller 23 starts to move becomes larger than the normal time. In this case, the difference between the acceleration assumed at the time of designing the fuel pump controller 8 and the acceleration at the time when the pump motor 22 rotates becomes too large. Since the 0 cross of the induced voltage of the pump motor 22 is covered with the mask for restricting erroneous detection, the pump motor 22 is out of phase. Therefore, when the first check target rotation speed is high, the start of the pump motor 22 can be easily failed.

If the torque is large when the impeller 23 is stationary, the impeller 23 cannot be set to the prescribed position at the time of starting the pump motor 22. In this case, the pump motor 22 cannot be started satisfactorily. Therefore, when the starting duty is small, the start of the pump motor 22 can be easily failed.

Then, the CPU 13*a* determines whether the start of the pump motor 22 is successful after starting the pump motor 22 at the first check target rotation speed and the first check start duty.

Next, the CPU 13*a* sets the target rotation speed to the second check target rotation speed set in advance for the torque abnormality check, sets the start duty to the second check start duty set in advance for the torque abnormality check, and starts the pump motor 22. The second check target rotation speed is set to be lower than the target rotation speed when the pump motor 22 is started in a normal state. The second check start duty is set to be larger than the start duty when the pump motor 22 is started in a normal state. The second check target rotation speed and the second check start duty are conditions for making it easy to successfully start the pump motor 22.

Then, the CPU 13*a* determines whether the start of the pump motor 22 is successful after starting the pump motor 22 at the second check target rotation speed and the second check start duty.

When the torque abnormality check ends, in S100, the CPU 13*a* determines whether a torque abnormality has occurred based on the check result in S90. Specifically, the CPU 13*a* determines that the torque abnormality has occurred when the start of the pump motor 22 has failed at the first check target rotation speed and the first check start duty and the start of the pump motor 22 has succeeded at the second check target rotation speed and the second check start duty.

If the torque abnormality has not occurred, the CPU 13*a* proceeds to S20. When the torque abnormality has occurred, the CPU 13*a* transmits a torque abnormality notification indicating that the torque abnormality has occurred to the engine controller 7 in S110. The engine controller 7 that has received the torque abnormality notification transmits the torque abnormality notification to a meter control device that controls a meter panel displaying the vehicle state and the like to the driver. The meter control device that has received the torque abnormality notification causes the meter panel to display that the torque abnormality has occurred. Accordingly, the driver of the vehicle can recognize that the torque abnormality occurs in the fuel pump 3.

Further, in S120, the CPU 13*a* executes an abnormality time process, and proceeds to S20. Specifically, in order to lower the temperature of the pump motor 22, the CPU 13*a* waits in a state where the driving of the pump motor 22 is stopped until a preset waiting time (such as 60 seconds) elapses. When the waiting time elapses, the CPU 130*a* proceeds to S20.

The fuel pump controller 8 determines whether the motor rotation control for rotating the pump motor 22 has failed. Then, the fuel pump controller 8 calculates the number of control failures COUNT_F. Further, the fuel pump controller 8 determines whether an abnormality has occurred in the pump motor 22 based on the number of control failures COUNT_F. This abnormality means that the torque applied to the impeller 23, which is fixed to the pump motor 22 to rotate by the driving of the pump motor 22, increases. The number of control failures COUNT_F is a parameter having a positive correlation with the frequency of failures in the motor rotation control. The expression "having a positive correlation with the frequency" includes not only a case where the parameter increases in a stepwise manner as the frequency increases, but also a case where the parameter continuously increases as the frequency increases.

The fuel pump controller 8 can determine an abnormality in which a foreign substance is caught in the impeller 23 of the fuel pump 3 or an abnormality in which the impeller 23 of the fuel pump 3 interferes with the first casing 41 or the second casing 42 of the fuel pump, when the frequency of failures in the motor rotation control increases. Therefore, when the torque applied to the pump motor 22 of the fuel pump 3 increases, the fuel pump controller 8 can identify the cause of the abnormality, and can improve the detection accuracy of the abnormality occurring in the pump motor 22 of the fuel pump 3.

The fuel pump controller 8 determines whether a preset confirmation starting condition, which indicates that the frequency of failures in the motor rotation control is high, is satisfied based on the number of control failures COUNT_F. When the confirmation starting condition is satisfied, the fuel pump controller 8 executes a confirmation motor start for starting the pump motor 22 under a start condition so that the start of the pump motor 22 is likely to fail. The confirmation starting condition of the present embodiment is that the number of control failures COUNT_F is larger than a preset abnormality determination value J1. The start condition is that the target rotation speed is set to a first check target rotation speed and the start duty is set to a first check start duty. Then, the fuel pump controller 8 determines whether an abnormality has occurred in the pump motor 22 based on the execution result of the confirmation motor start. The fuel pump controller 8 can more accurately detect an abnormality in which a foreign matter is caught in the impeller 23 of the fuel pump 3 or an abnormality in which the impeller 23 of the fuel pump 3 interferes with the first casing 41 or the second casing 42 of the fuel pump. Therefore, the fuel pump controller 8 can further improve the detection accuracy of the abnormality occurring in the pump motor 22 of the fuel pump 3.

When it is determined that an abnormality has occurred in the pump motor 22, the fuel pump controller 8 notifies the engine controller 7 that an abnormality has occurred in the pump motor 22 by transmitting a torque abnormality notification to the engine controller 7. Accordingly, when an abnormality occurs in the pump motor 22, the fuel pump controller 8 can cause the engine controller 7 to execute a process for coping with the abnormality or cause the driver of the vehicle to recognize the occurrence of the abnormality.

In the embodiment, the fuel pump controller 8 corresponds to a motor control device, and the pump motor 22 corresponds to a motor. In addition, S40 corresponds to a rotation control determination unit, S50 corresponds to a parameter calculation unit, the number of control failures COUNT_F corresponds to a control failure frequency parameter, and S60 and S100 correspond to an abnormality determination unit.

Further, S90 corresponds to a motor starting unit, and S110 corresponds to an abnormality notification unit.

Second Embodiment

A second embodiment will be described with reference to the drawings. Note that in the second embodiment, portions different from the first embodiment is described. Common configurations are denoted by the same reference numerals.

The fuel supply system 1 of the second embodiment is different from the fuel supply system of the first embodiment in that the motor control process is changed. The motor control process of the second embodiment is different from that of the first embodiment in that the processes of S60 and S110 are omitted and the processes of S15, S55, S65, and S115 are added.

Figure 5:
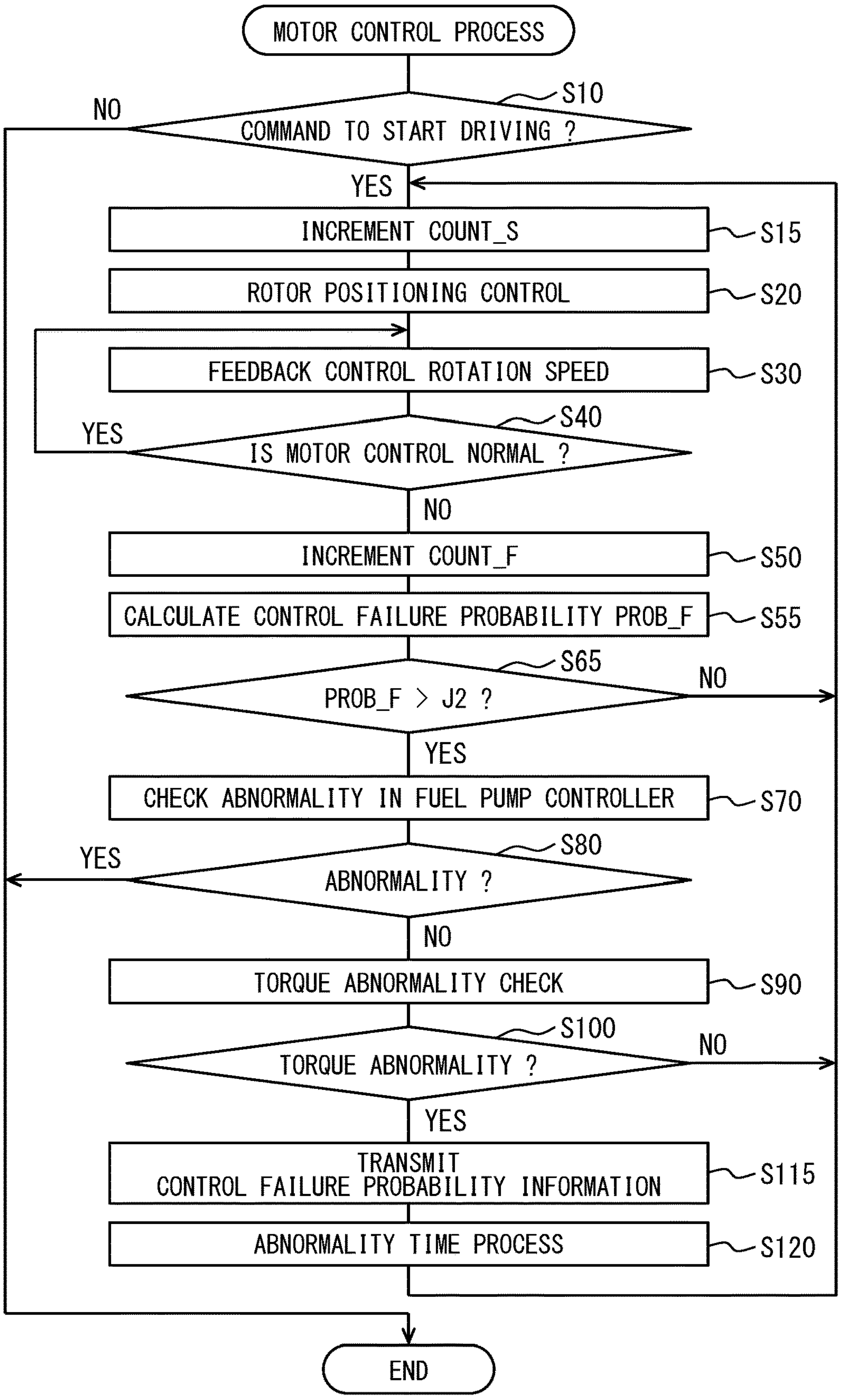
FIG. 5 is a flowchart illustrating a motor control process according to a second embodiment.

That is, as shown in FIG. 5, when a command instructing the start of driving is received in S10, the CPU 13*a* increments the number of starts COUNT_S in S15, and proceeds to S20.

When the process of S50 ends, the CPU 13*a* calculates the control failure probability PROB_F by dividing the number of control failures COUNT_F by the number of starts COUNT_S in S55.

Then, in S65, the CPU 13*a* determines whether the control failure probability PROB_F is larger than a preset abnormality determination value J2. If the control failure probability PROB_F is equal to or less than the abnormality determination value J2, the CPU 13*a* proceeds to S15. When the control failure probability PROB_F is larger than the abnormality determination value J2, the CPU 13*a* proceeds to S70.

When it is determined in S100 that the torque abnormality has occurred, the CPU 13*a* transmits control failure probability information indicating the value of the control failure probability PROB_F to the engine controller 7 in S115, and the process proceeds to S120.

The fuel pump controller 8 determines whether the motor rotation control for rotating the pump motor 22 has failed. Then, the fuel pump controller 8 calculates the control failure probability PROB_F. Further, the fuel pump controller 8 determines whether an abnormality has occurred in the pump motor 22 based on the control failure probability PROB_F. The control failure probability PROB_F is a parameter having a positive correlation with the frequency of failures in the motor rotation control.

When the value of the control failure probability PROB_F increases, the fuel pump controller 8 can determine that an abnormality has occurred in which foreign matter is caught in the impeller 23 of the fuel pump 3 or the impeller 23 of the fuel pump 3 interferes with the first casing 41 or the second casing 42. Therefore, when the abnormality in which the torque applied to the pump motor 22 of the fuel pump 3 increases occurs, the fuel pump controller 8 can identify the cause of the abnormality, and can improve the detection accuracy of the abnormality occurring in the pump motor 22 of the fuel pump 3.

The fuel pump controller 8 notifies the control failure probability by transmitting the control failure probability information indicating the value of the control failure probability PROB_F to the engine controller 7. Accordingly, when an abnormality occurs in the pump motor 22, the fuel pump controller 8 can cause the engine controller 7 to execute a process for coping with the abnormality or cause the driver of the vehicle to recognize the occurrence of the abnormality.

In the embodiment, S15, S50, and S55 correspond to a parameter calculation unit and a failure probability calculation unit, the control failure probability PROB_F corresponds to a control failure frequency parameter, S65 and S100 correspond to an abnormality determination unit, and S115 corresponds to a failure probability notification unit.

Third Embodiment

A third embodiment will be described with reference to the drawings. In the third embodiment, portions different from those of the first embodiment will be described. Common configurations are denoted by the same reference numerals.

The fuel supply system 1 of the third embodiment is different from the fuel supply system 1 of the first embodiment in that the control unit 13 of the fuel pump controller 8 executes the torque abnormality detection process. Next, a procedure of the torque abnormality detection process executed by the CPU 13*a* of the control unit 13 will be described. The motor control process is repeatedly executed during the operation of the control unit 13.

Figure 6:
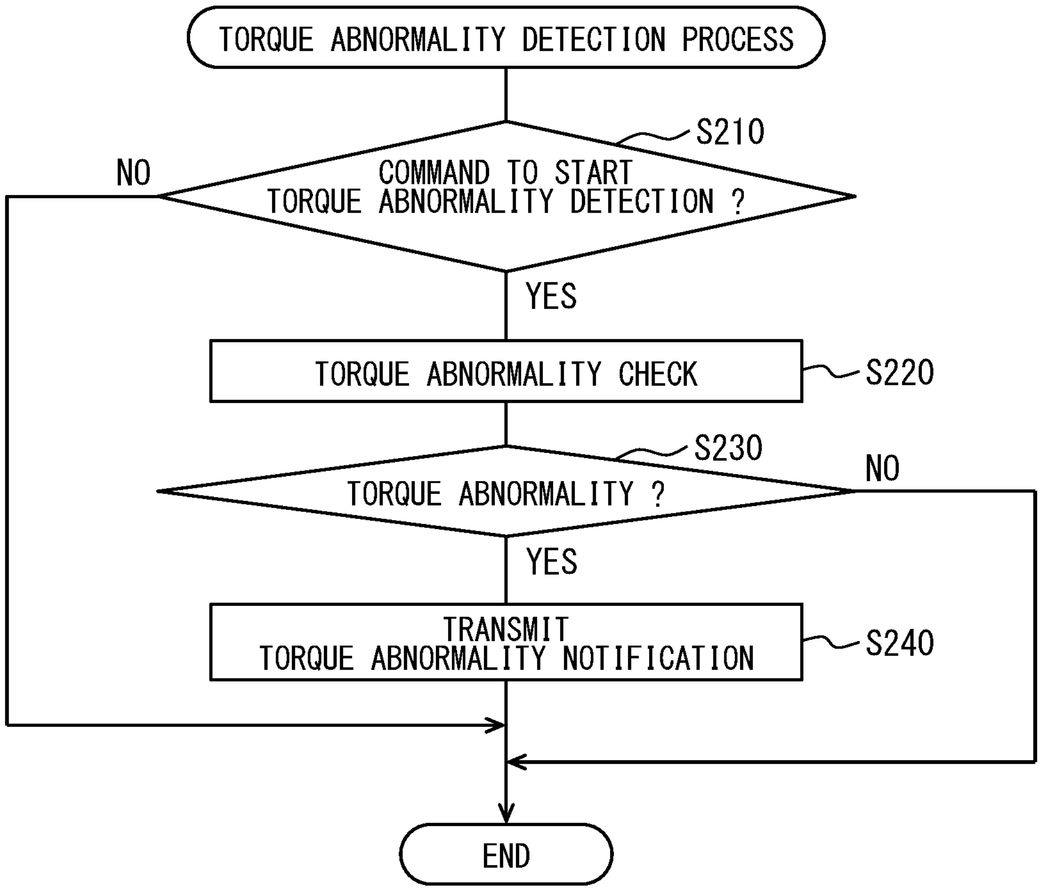
FIG. 6 is a flowchart illustrating a torque abnormality detection process.

When the torque abnormality detection process is executed, as shown in FIG. 6, the CPU 13*a* first determines in S210 whether an abnormality detection command instructing the start of torque abnormality detection has been received from the engine controller 7. When at least one of the first start determination condition, the second start determination condition, and the third start determination condition is satisfied, the engine controller 7 transmits an abnormality detection command to the fuel pump controller 8.

The first start determination condition is that the temperature of the fuel tank 2 is equal to or higher than a preset first start determination temperature and immediately after the engine EG is stopped.

The second start determination condition is that the temperature of the fuel pump 3 is equal to or higher than a preset second start determination temperature and immediately after the engine EG is stopped.

The third start determination condition is that the temperature of the fuel in the fuel tank 2 or the fuel pipe 5 is equal to or higher than a preset third start determination temperature and immediately after the engine EG is stopped.

When the abnormality detection command is not received, the CPU 13*a* ends the torque abnormality detection process.

When the abnormality detection command is received, in S220, the CPU 13*a* executes the torque abnormality check in the same manner as in S90.

In S230, the CPU 13*a* determines whether or not a torque abnormality has occurred in the same manner as in S100. When the torque abnormality has not occurred, the CPU 13*a* ends the torque abnormality detection process. When the torque abnormality has occurred, the CPU 13*a* transmits the torque abnormality notification to the engine controller 7 in S240 in the same manner as in S110, and ends the torque abnormality detection process.

When receiving the abnormality detection command from the engine controller 7, the fuel pump controller 8 executes the confirmation motor start for starting the pump motor 22 under the confirmation starting condition set in advance so that the start of the motor is likely to fail. Then, the fuel pump controller 8 determines whether an abnormality has occurred in the pump motor 22 based on the execution result of the confirmation motor start.

When the pump motor 22 is started under the confirmation starting condition and the start of the pump motor 22 fails, the fuel pump controller 8 can determine an abnormality in which foreign matter is caught in the impeller 23 of the fuel pump 3 or an abnormality in which the impeller 23 of the fuel pump 3 interferes with the first casing 41 or/and the second casing 42 of the fuel pump 3. Therefore, when the torque applied to the pump motor 22 of the fuel pump 3 increases, the fuel pump controller 8 can identify the cause of the abnormality, and can improve the detection accuracy of the abnormality occurring in the pump motor 22 of the fuel pump 3.

In the embodiment, the engine controller 7 corresponds to an external device, S210 and S220 correspond to a command-time motor starting unit, and S230 corresponds to a command-time abnormality determination unit.

The engine EG corresponds to an internal combustion engine. The first start determination temperature, the second start determination temperature, and the third start determination temperature correspond to a start determination temperature.

Although the embodiment of the present disclosure has been described above, the present disclosure is not limited to the above embodiment, and various modifications can be made.

First Modification

For example, in the above embodiment, the torque abnormality check is executed when the number of control failures COUNT_F is larger than the abnormality determination value J1, and it is determined whether an abnormality has occurred in the pump motor 22 based on the result of the torque abnormality check. However, when the number of control failures COUNT_F is larger than the abnormality determination value J1, it may be determined that an abnormality has occurred in the pump motor 22.

Second Modification

In the above embodiment, after the process of starting the pump motor 22 at the first check target rotation speed and the first check start duty is performed, the process of starting the pump motor 22 at the second check target rotation speed and the second check start duty is performed. However, the determination may be made without executing the process of starting the pump motor 22 at the second check target rotation speed and the second check start duty. That is, the CPU 13*a* may determine that the torque abnormality has occurred when the start of the pump motor 22 has failed as a result of performing the process of starting the pump motor 22 at the first check target rotation speed and the first check start duty.

Third Modification

In the embodiment, the number of control failures COUNT_F or the control failure probability PROB_F having a positive correlation with the frequency of failures in the motor rotation control is calculated, and it is determined whether an abnormality has occurred in the pump motor 22 based on the number of control failures COUNT_F or the control failure probability PROB_F. However, the number of control successes or the control success probability having a negative correlation with the frequency of failures in the motor rotation control may be calculated, and it may be determined whether an abnormality has occurred in the pump motor 22 based on the number of control successes or the control success probability.

Fourth Modification

In the embodiment, the abnormality detection command is transmitted to the fuel pump controller 8 when at least one of the temperature of the fuel tank 2, the temperature of the fuel pump 3, or the temperature of the fuel becomes equal to or higher than the preset start determination temperature. However, in case where the temperature in the vehicle cabin or the temperature of outside air has a correlation with at least one of the temperature of the fuel tank 2, the temperature of the fuel pump 3, or the temperature of the fuel, the abnormality detection command may be transmitted to the fuel pump controller 8 when the temperature in the vehicle cabin or the temperature of outside air becomes equal to or higher than a preset start determination temperature.

The multiple functions of one component in the above embodiment may be realized by multiple components, or a function of one component may be realized by the multiple components. In addition, multiple functions of multiple components may be realized by one component, or a single function realized by multiple components may be realized by one component. Moreover, part of the configuration of the above embodiment may be omitted. At least a part of the configuration of the above embodiment may be added to or replaced with the configuration of another embodiment.

In addition to the fuel pump controller 8, the present disclosure may be implemented in various forms such as a system including the fuel pump controller 8 as a component, a program for causing a computer to function as the fuel pump controller 8, a non-transitory tangible recording medium such as a semiconductor memory storing the program, and a motor control method.

In addition to the fuel pump controller 8, the present disclosure may be implemented in various forms such as a system including the fuel pump controller 8 as a component, a program for causing a computer to function as the fuel pump controller 8, a non-transitory tangible recording medium such as a semiconductor memory storing the program, and an abnormality detection method.

What is claimed is:

1. A motor control device configured to control a motor, comprising:

a microcontroller
- configured to determine whether a motor rotation control to rotate the motor fails;
- configured to calculate a control failure frequency parameter having a correlation with a frequency of failure in the motor rotation control based on a determination result by the microcontroller; and
- configured to determine whether an abnormality has occurred in the motor based on the control failure frequency parameter.

2. The motor control device according to claim 1, wherein the microcontroller determines whether a torque, which is applied to a rotating member fixed to the motor to rotate, increases as the abnormality.

3. The motor control device according to claim 1, wherein the microcontroller determines whether a preset confirmation starting condition, which indicates that the frequency of failures in the motor rotation control is high, is satisfied based on the control failure frequency parameter, the microcontroller is further configured to execute a confirmation motor start for starting the motor so that a start of the motor is likely to fail when the preset confirmation starting condition is satisfied, and the microcontroller determines whether an abnormality has occurred in the motor based on an execution result of the confirmation motor start by the microcontroller.

4. The motor control device according to claim 1, the microcontroller is further configured to notify that an abnormality has occurred in the motor when the microcontroller determines that an abnormality has occurred in the motor.

5. The motor control device according to claim 1, wherein the microcontroller is further configured to calculate a control failure probability that is a probability of failure in the motor rotation control; and the microcontroller is further configured to notify the control failure probability.

6. A motor control device configured to control a motor, comprising:

a microcontroller
- configured to execute a confirmation motor start for starting the motor under a confirmation starting condition set in advance so that a start of the motor is likely to fail when an abnormality confirmation command is received from an external device; and
- configured to determine whether an abnormality has occurred in the motor based on an execution result of the confirmation motor start by the microcontroller.

7. The motor control device according to claim 6, which is mounted on a vehicle so as to control the motor of a fuel pump configured to pump fuel from a fuel tank storing the fuel to supply the fuel to an internal combustion engine mounted on the vehicle via a fuel pipe, wherein in case where at least one of a temperature of the fuel tank, a temperature of the fuel pump, a temperature of the fuel, a temperature correlated with the temperature of the fuel tank, a temperature correlated with the temperature of the fuel pump, or a temperature correlated with the temperature of the fuel is equal to or higher than a preset start determination temperature, the external device transmits the abnormality confirmation command to the motor control device immediately after driving of the internal combustion engine is stopped.

* * * * *